Patented Nov. 17, 1931

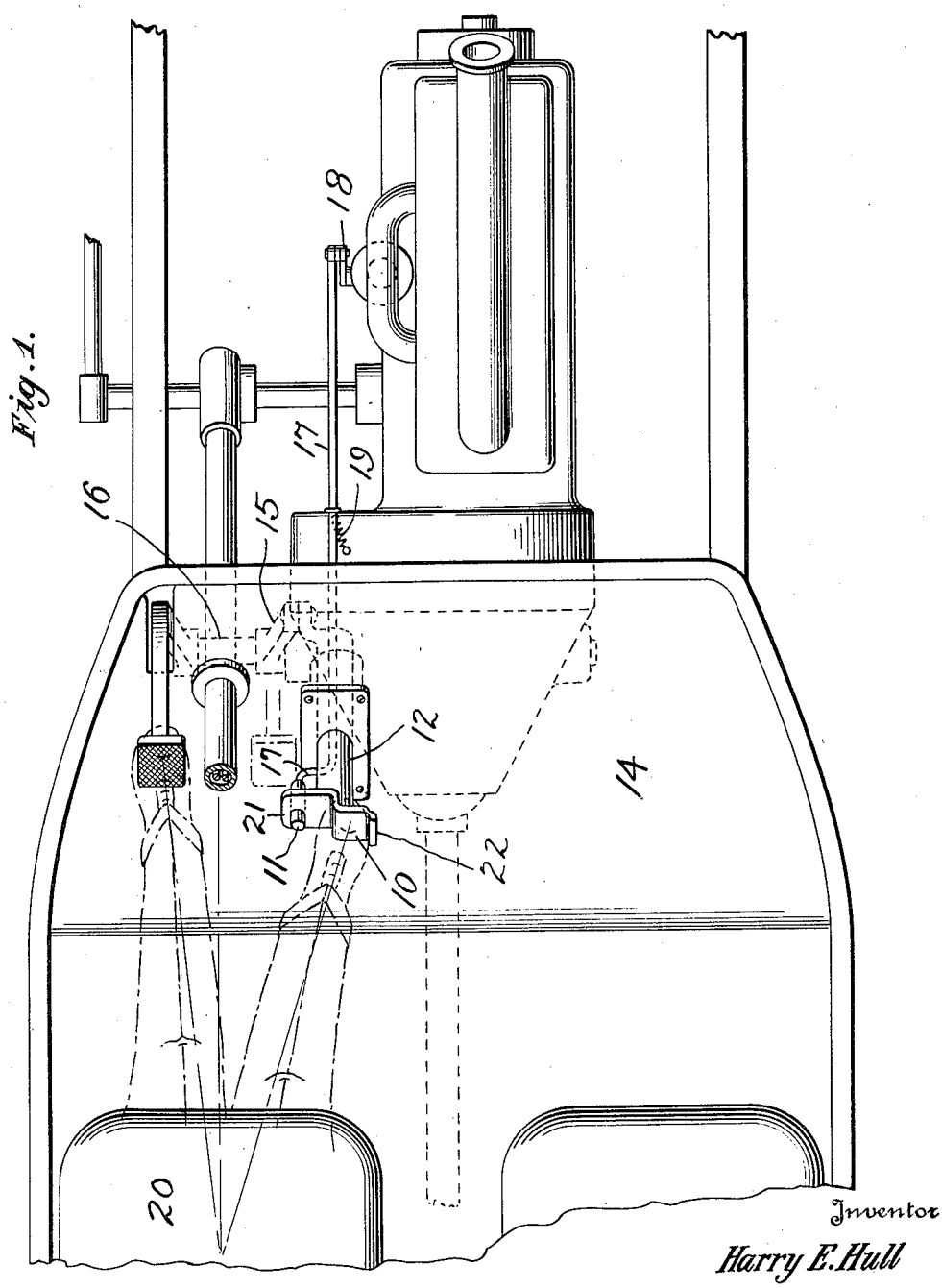

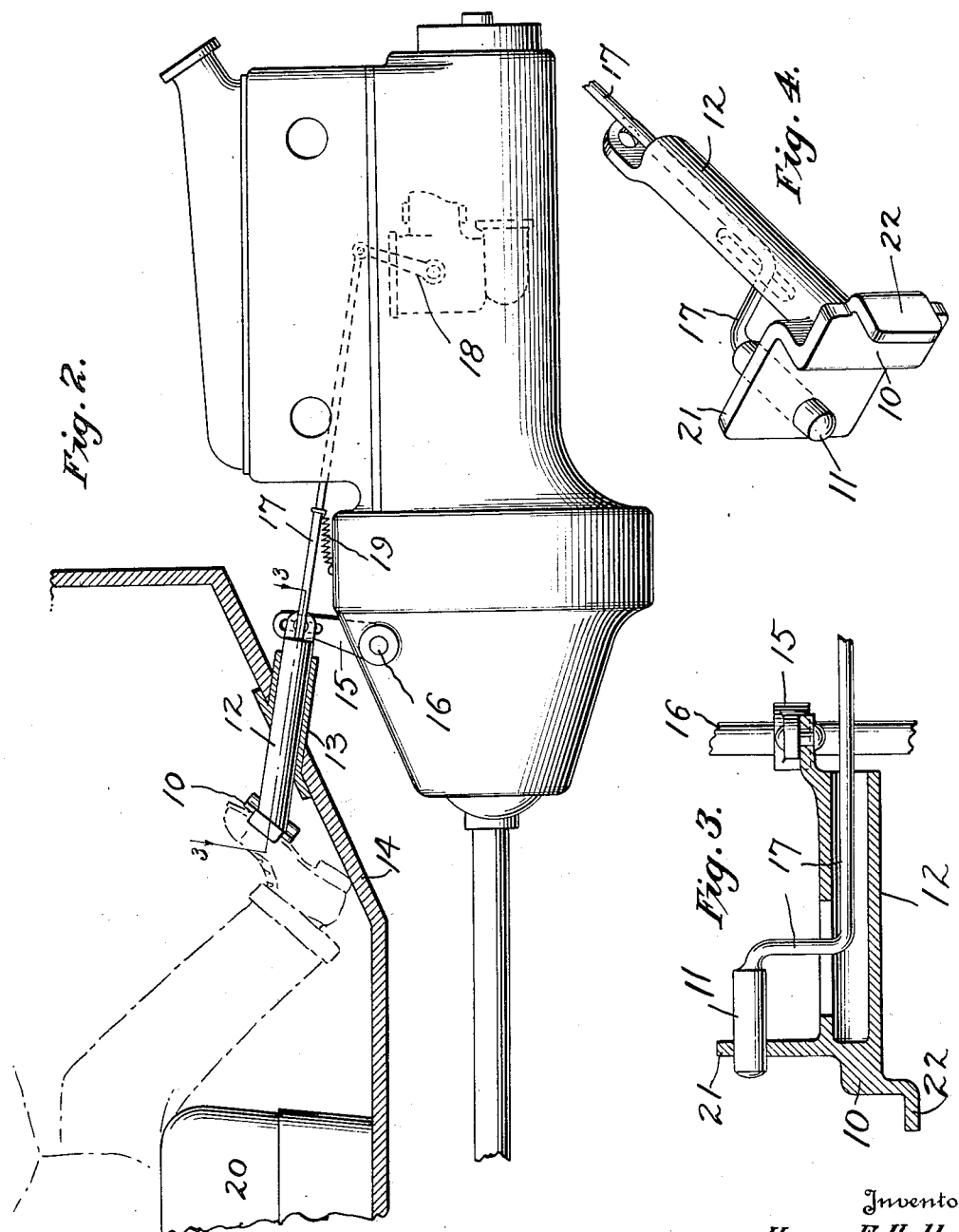

1,832,125

UNITED STATES PATENT OFFICE

HARRY E. HULL, OF WASHINGTON, DISTRICT OF COLUMBIA

MOTOR VEHICLE CONTROL

Application filed April 15, 1930. Serial No. 444,532.

In the ordinary or standard construction of automobiles, the right foot of the driver is utilized for operating the accelerator pedal and the brake pedal, and these pedals are close together in a side by side relation. As a result of this arrangement, in the excitement of an emergency requirement for instant stoppage of the car, the accelerator pedal may be pressed, instead of the brake pedal, and disastrous consequences follow. Many devices have been patented having in view the avoidance of operating the accelerator when the brake should be applied. Such a device is the subject of my patent reissued December 10, 1929, No. 17,520.

From long study of the subject and experimental investigation, I have concluded that to secure the required high efficiency in such a device the construction and arrangement thereof must be such that to secure the operation of the brake and prevent operation of the accelerator, what may be termed the instinctive or automatic reactions and muscular movements of the body should be utilized. Thus, under the emergency calling for sudden stoppage of the car, the natural impulse is to thrust the right leg and foot forward since from habit, that is the brake pedal operating movement, and of necessity, there is a normal tendency for the leg pressure to be exerted laterally to the right as well as downward, because of the natural divergence of the right leg from the body connection, or hip joint. In making my invention, I have taken these considerations into account, and have produced such a construction of accelerator and brake pedal and location thereof relative to one another and to the driver's seat, that the natural, automatic action is to apply pressure only to the brake pedal alone, without the exercise of conscious thought calling for selection as between accelerator pedal and brake pedal, in an emergency which affects a person's power of conscious thought. The general object of my invention is to reduce to the minimum if not entirely to remove, the danger of operating the accelerator when the brakes should be applied.

My invention consists in whatever is described by or is included within the terms or scope of the appended claims.

In the drawings, which show one embodiment of my invention:—

Fig. 1 is a top plan view of the front portion of an automobile equipped with my invention;

Fig. 2 is a vertical section thereof;

Fig. 3 is a detail view in section on line 3—3, Fig. 2;

Fig. 4 is a detail view in perspective of the brake and accelerator pedals.

In what I regard now as the most satisfactory form of my invention, I place the brake pedal, 10, and the accelerator pedal, 11, alongside one another, with the brake pedal at the right of the driver, and so that the sole of the driver's right foot can bear or rest upon either. The brake pedal has possibility of straight forward movement of the foot only to apply the brakes, and the accelerator is constructed and arranged to require a sidewise shifting motion of the foot before it can be operated for giving gas. It may, as shown in the drawings, be situated wholly to one side of the foot when the latter is in the normal position for applying the brakes. If desired, the accelerator pedal may be hinged or pivoted to the brake pedal, and on an axis or joint, that extends parallel with the length of the foot, or as shown, it may have a straight line movement.

The brake pedal has a straight shank, 12, slidably mounted in a guide, 13, fixed in a hole in the floor or foot board, 14, so that it slants at a slight angle from the horizontal downward and forward and at its inner end is pivoted to a crank arm. 15, fixed to the horizontal rock shaft, 16, which is suitably connected with the brake bands.

The accelerator pedal has on its forward side a shank or stem, 17, that passes through a slot into the shank, 12, (which is hollow) and extends to, and at its front end is pivotally connected to the carbureter lever, 18, for controlling the gas supply. A coiled spring, 19, retracts the rod, and the accelerator pedal against foot pressure movement. It will be seen that the connection between the two pedals allows motion of the brake pedal to apply the brakes without rocking the control lever, 18, as the accelerator, 11, does not move with the brake pedal.

By reference to Fig. 1, it will be seen that the brake and accelerator pedals are situated so far from a median line or plane passing vertically through the driver's seat, 20, that the driver's right leg, 21, must extend therefrom in the normal, natural position forward and to the right, so that the direction of forward pressure tends to throw and keep the sole of the foot flatwise against the brake pedal, and to rock the foot, if it tends at all to rock, away from the accelerator pedal, and hence away from the latter. Thus, only by a conscious choice or selected action of the foot can the accelerator pedal be operated; and in an emergency, the dominating action to apply the brakes will alone be exerted, following the instinctive normal action or impulse.

The accelerator pedal is operated without removing the foot from the brake pedal.

It will be observed that the movement of the brake pedal under pressure of the foot is a rectilineal one without any rocking or turning as when the foot-engaging portion of a brake pedal is pivoted or swings on an axis and as such rectilineal movement is in the line of thrust or pressure of the foot, the foot more advantageously acts.

Preferably the accelerator pedal, 11, plays through an opening in a lateral extension, 22, of the brake pedal, 10, which is in a different plane and forward of the surface of the pedal 10, with which the sole of the foot engages in exerting braking pressure. Preferably at the right, said sole-engaging portion of the pedal, 10, has an upstanding flange or lip, 23, to prevent or restrain sidewise movement of the foot while exerting pressure on the brake pedal.

Preferably, the accelerator pedal is so close to the brake pedal that but little sidewise movement of the foot from the brake pedal is required to reach and act upon the accelerator pedal so that substantially no sidewise bodily displacement of the foot is required.

What I claim is:—

1. A motor vehicle having a driver's seat and brake operating means including a pedal, movable to apply the brakes by forward pressure thereon of the driver's right foot, and fuel control means including an element at the left of the foot-engaging portion of said pedal engageable and movable by the same foot while in position to apply moving pressure to the brake pedal, said brake pedal being located a substantial distance to the right of the transverse center of the driver's seat so that as the driver sits thereon in normal position and exerts braking pressure with his right leg, the direction of such pressure is inclined to the right.

2. A motor vehicle having a driver's seat and brake operating means including a pedal, movable to apply the brakes by forward pressure thereon of the driver's right foot, and fuel control means comprising a pedal at the left of the brake pedal, engageable and movable by the same foot while in position to apply moving pressure to the brake pedal, said brake pedal being located a substantial distance to the right of the transverse center of the driver's seat so that as the driver sits thereon in normal position and exerts braking pressure with his right leg, the direction of such pressure is inclined to the right.

3. A control device for motor vehicles comprising a brake pedal having a forwardly extending straight hollow shank with a slot opening through its wall, means for guiding said shank in straight line movement in applying the brakes, an accelerator pedal adjacent the brake pedal and a stem reaching forward from the accelerator pedal to the carbureter extending from the pedal through said slot to the interior of the brake pedal shank and extending forward through such shank.

4. A control device for motor vehicles comprising a to and fro moving brake pedal, having a foot-sole-engaging portion, a tubular shank extending forward from the brake pedal, a fuel pedal having an exposed sole-engaging part adjacent the foot-sole-engaging portion of the brake pedal, the two pedals having a loose connection which allows forward movement of each independent of the other, whereby when the brake pedal is operated no movement of the fuel-pedal takes place, and a fuel-control rod extended from the fuel-pedal forward through said tubular shank.

In testimony whereof I hereunto affix my signature.

HARRY E. HULL.